United States Patent
Iida et al.

(10) Patent No.: US 7,196,978 B2
(45) Date of Patent: Mar. 27, 2007

(54) OPTICAL HEAD

(75) Inventors: Atsushi Iida, Tokyo (JP); Toshio Watanabe, Kanagawa (JP); Hironobu Tanase, Kanagawa (JP); Kenji Yamamoto, Kanagawa (JP); Gakuji Hashimoto, Saitama (JP)

(73) Assignee: Sony Corporation (JP)

( * ) Notice: Subject to any disclaimer, the term of this patent is extended or adjusted under 35 U.S.C. 154(b) by 163 days.

(21) Appl. No.: 10/501,717

(22) PCT Filed: Feb. 7, 2003

(86) PCT No.: PCT/JP03/01306

§ 371 (c)(1),
(2), (4) Date: Feb. 9, 2005

(87) PCT Pub. No.: WO03/067583

PCT Pub. Date: Aug. 14, 2003

(65) Prior Publication Data

US 2005/0128893 A1    Jun. 16, 2005

(30) Foreign Application Priority Data

Feb. 8, 2002   (JP)   ............................. 2002-032405
May 2, 2002    (JP)   ............................. 2002-130331

(51) Int. Cl.
*G11B 7/00*   (2006.01)

(52) U.S. Cl. ................................. 369/44.15; 369/44.14
(58) Field of Classification Search ................ None
See application file for complete search history.

(56) References Cited

U.S. PATENT DOCUMENTS 5,666,235 A * 9/1997 Izuka ........................ 359/814

(Continued)

FOREIGN PATENT DOCUMENTS

JP    5-128559 A    5/1993

(Continued)

OTHER PUBLICATIONS

International Search Report Apr. 30, 2003.

*Primary Examiner*—Muhammad Edun
(74) *Attorney, Agent, or Firm*—Rader, Fishman & Grauer PLLC; Ronald P. Kananen

(57) ABSTRACT

An optical head enabling a size reduction so that the optical head can be stored in an opening of a cartridge for a disk and enabling an improvement in the dynamic performance as the density and transfer rate are increased is provided. In a two-axis actuator optical head capable of driving an objective lens (102) along the Z axis in the focus direction, that is, vertical to the surface of the optical disk and along the X axis in the tracking direction, that is, the radial direction of the optical disk. The objective lens (102) is disposed in the center of the coil bobbin (101), a focusing coil (103) is disposed around the coil bobbin (101) and is wound around the X axis, and tracking coils (104a and 104b) are disposed on both ends of the coil bobbin (101) in the X axis direction and are wound around the X axis. Pairs of magnets (107a to 107d) are disposed plane-symmetrically with the Z-Y plane including the Z axis aligned with the optical axis of the objective lens (102) and the Y axis and with the Z-X plane including the Z axis and the X axis.

10 Claims, 8 Drawing Sheets

U.S. PATENT DOCUMENTS 6,480,460 B1 * 11/2002 Ohkuma et al. ............ 369/246

FOREIGN PATENT DOCUMENTS

| JP | 5-342605 A | 12/1993 |
|----|------------|---------|
| JP | 7-225960 A | 8/1995 |
| JP | 10-302281 A | 11/1998 |
| JP | 11-144270 A | 5/1999 |
| JP | 2000-21586 A | 8/2000 |
| JP | 2001-266394 A | 9/2001 |
| JP | 2001-331956 A | 11/2001 |
| JP | 2003-6902 A | 1/2003 |

* cited by examiner

OPTICAL HEAD

TECHNICAL FIELD

The present invention relates to an optical head used for an optical pick-up such as a magnetic optical disk apparatus or a DVD apparatus, and, more specifically, the invention relates to an optical head capable of realizing a high recording density and small diameter optical disk system, wherein the optical head is a two-axis actuator optical head capable of moving an objective lens in two axial direction, i.e., the focusing direction and the tracking direction.

BACKGROUND ART

Recently, along with the advancement of basic technology, the development of optical disks originating from compact disks (CDs) has lead to a significant increase in the memory size per unit area of the disk. This typical basic technology includes shortening the frequency of the light source, increasing the numerical aperture of the objective lens, and developing a more efficient recording mode.

Such an increase in the recording density of an optical disk has led to innovative new products. One such product is a CD-size optical disk having a large recording capacity. Such an optical disk is anticipated to function as an image recording device or computer memory device for recording several hours of high-definition images without deteriorating the quality of the image. Another optical disk developed through the increase in the recording density of optical disks is a small diameter optical disk having a sufficient memory capacity.

In particular, use of this small diameter optical disk in the field of portable apparatuses is expected. For example, the small diameter optical disk may be installed in a camcoder, a notebook computer, a personal digital assistance (PDA), a digital camera, or a portable game device. The small diameter optical disk allows the size of the portable apparatuses to be reduced and to run an application that requires a large data capacity, which have not been possible using known technology.

There are several technical difficulties in increasing the recording density of a small diameter optical disk used for portable apparatuses. One difficulty is to develop a small optical head corresponding to the small diameter optical disk.

When the numerical aperture of the objective lens is increased by employing a basic technology for realizing a high-capacity optical disk by increasing the recording density, in exchange for increasing the capacity, the effect of dust contaminating the optical disk becomes large. Therefore, dust control of the optical disk becomes essential, and it becomes necessary to store the optical disk inside a cartridge. Increasing the numerical aperture of the objective lens causes the working distance between the objective lens and the optical disk to become smaller. Due to these two factors, in an optical disk system, the optical head that holds the objective lens and that can be moved to a predetermined position must be of a size small enough to be stored inside the opening for the cartridge (shutter opening window).

On the basis of the description above, when using a small diameter optical disk, the opening for the cartridge becomes small since the diameter of the optical disk is small. As a result, it becomes necessary to develop an optical head having a significantly small size.

A known optical head for an optical pick-up will be described by referring to the drawings.

FIG. 8 is a perspective view of an example of a known optical head including a two-axis actuator of an open magnetic path.

The optical head illustrated in FIG. 8 includes a coil bobbin 14, an objective lens 15, a focusing coil 16, a pair of tracking coils 17a and 17b, four flat springs 18a to 18d, a support 19, magnets 20a and 20b, and yokes 21a and 21b.

The objective lens 15 is supported at the center of the coil bobbin 14 by aligning the optical axis with the focusing direction (Z axis). The focusing coil 16 is disposed on the periphery of the coil bobbin 14 so that the focusing coil 16 is wound around the Z axis extending in the focusing direction. Furthermore, the tracking coils 17a and 17b are rectangularly wound around the X axis at the ends of the coil bobbin 14 in the tracking direction (X axis), which is the direction orthogonal to the optical axis of the objective lens 15.

The coil bobbin 14 including the objective lens 15 is supported by the support 19 with four flat springs 18a to 18d so that the objective lens 15 can oscillate in the focusing direction (Z axis) and the tracking direction (X axis).

The coil bobbin 14 is interposed between the yokes 21a and 21b, wherein the yokes 21a and 21b are disposed so that they are vertical to the Y axis and oppose each other in the Y axis direction orthogonal to the focusing direction (Z axis direction) and the tracking direction (X axis direction). A pair of magnets 20a and 20b of the same pole (e.g., north pole), are disposed on the yokes 21a and 21b so that they oppose each other. The coil bobbin 14 including the focusing coil 16 and tracking coils 17a and 17b is disposed within the magnetic field generated by the magnets. 20a and 20b.

In such an optical head, by applying an electrical current to the focusing coil 16 that is orthogonal to the magnetic field component in the Y axis direction of the magnets 20a and 20b, a driving force in the focusing direction (Z axis direction) is applied to the coil bobbin 14 including the objective lens 15. By applying an electrical current to the tracking coils 17a and 17b orthogonal to the magnetic field component in the Y axis direction of the magnets 20a and 20b, a driving force in the tracking direction (X axis direction) is applied to the coil bobbin 14 including the objective lens 15.

FIG. 9 is a perspective view of another example of a known optical head including a two-axis actuator having a closed magnetic path.

The optical head illustrated in FIG. 9 includes a chassis 22, an objective lens 23, a focusing coil 24, a pair of tracking coils 25a and 25b, four flat springs 26a to 26d, a support 27, a magnet 28, a yoke 29, and a back yoke 30.

The coil bobbin 22 extends in the Y axis direction, which is perpendicular to the focusing direction (Z axis). At the tip of the coil bobbin 22, the objective lens 23 is supported. The focusing coil 24 is disposed inside an opening 221 formed at the rear edge of the coil bobbin 22 and is rectangularly wound around the Z axis in the focusing direction. The tracking coils 25a and 25b are rectangularly wound around the Y axis and are disposed in parallel in the tracking direction (X axis) so that they are in contact with the inner circumference of the focusing coil 24 on the side closer to the objective lens 23.

The coil bobbin 22 including the objective lens 23 is fixed to the support 27 by the four flat springs 26a to 26d so that the coil bobbin 22 can oscillate in the focusing direction (Z axis) and the tracking direction (X axis).

The yoke 29 is disposed orthogonally to the Y axis at a position close the support 27 on the inner side of the focusing coil 24 in the Y axis direction. The magnet 28 is disposed on the yoke 29. The back yoke 30 is disposed orthogonally to the Y axis in the opening 221, close to the objective lens 23 positioned on the outer side of the focusing coil 24 in the Y axis direction.

In the optical head illustrated in FIG. 9, similar to the optical head illustrated in FIG. 8, by applying an electrical current to the focusing coil 24 orthogonal to the magnetic field component in the Y axis direction of the magnet 28, a driving force in the focusing direction (Z axis direction) is applied to the coil bobbin 22 including the objective lens 23. In this case, because the back yoke 30 is disposed, the magnetic flux density increases. Moreover, the magnetic flux passes through the coil side contributing to the driving of the focusing coil 24 and forms a magnetic field distribution through the back yoke 30. In this way, the driving force generated in the opposite direction is reduced by magnetic flux lines passing through other coil sides.

The principle of driving the coil bobbin 22 including the objective lens 23 in the tracking direction will be described below.

One of the sides of the tracking coils 25a and 25b according to this embodiment is disposed orthogonally to the magnetic flux lines in the Y axis direction of the magnet 28 to generate a forward driving force in the tracking direction. Therefore, in this case, to prevent the generation of the backward driving force from second sides parallel to first sides of the tracking coils 25a and 25b, the tracking coils 25a and 25b are disposed plane-symmetrically with respect to the plane including the Y and Z axes and are center-displaced from the Y axis orthogonal to the optical axis of the objective lens for one back yoke such that magnetic flux lines are orthogonal to the fist sides of the tracking coils 25a and 25b and do not propagate to the second sides of the tracking coils 25a and 25b.

For such an optical head having a closed magnetic path, the magnetic circuit is disposed only on one side. Thus, the size of the optical head can be reduced in the Y axis direction.

FIG. 10 is a perspective view of another example of a known optical head including an axial-sliding-type two-axis actuator.

The optical head illustrated in FIG. 10 includes a coil bobbin 31, an objective lens 32, a focusing coil 33, a pair of tracking coils 34a and 34b, tracking magnets 35a and 35c, focusing magnets 35b and 35d, tracking yokes 36a and 36c, focusing yokes 36b and 36d, back yokes 37a and 37b, a shaft 38, and a counter balance 39.

The center of the circular coil bobbin 31 is attached to the shaft 38 protruding from the fixed portion in the focusing direction (Z axis direction) so that the coil bobbin 31 is rotatable around the shaft 38 and slidable on the shaft 38 in the focusing direction (Z axis direction). The coil bobbin 31 has an objective lens 32 decentered in the Y direction. Furthermore, the counter balance 39 is disposed on the opposite side to the objective lens 32.

The focusing coil 33 is wound around the external periphery of the coil bobbin 31. The tracking coils 34a and 34b are disposed on the ends of the coil bobbin 31 in the Y axis direction.

The tracking yokes 36a and 36c are disposed on the ends of the coil bobbin 31 in the Y axis direction so that the tracking yokes 36a and 36c oppose each other. On the inside of the tracking yokes 36a and 36c, the tracking magnets 35a and 35c are attached, respectively. The focusing yokes 36b and 36d are disposed on the ends of the coil bobbin 31 in the X axis direction. On the inside of the focusing yokes 36b and 36d, the focusing magnets 35b and 35d are attached, respectively.

The back yokes 37a and 37b are disposed on the inside of the coil bobbin 31 so that they oppose the focusing magnets 35b and 35d, respectively.

For such an axial sliding type optical head, illustrated in FIG. 10, by applying an electrical current to the focusing coil 33, the coil bobbin 31 moves in the Z axis direction relative to the shaft 38. In this way, the objective lens 32 moves in the focusing direction. By applying an electrical force to the tracking coils 34a and 34b, the coil bobbin 31 rotates around the shaft 38. In this way, the objective lens 32 moves in the tracking direction.

For a known optical disk system in which the size of the optical disk such as a CD or a DVD is 120 mm in diameter, the size of the optical head does not need to be reduced. Moreover, for a small diameter optical disk system such as an MD, the optical head does not necessarily have to be disposed inside an opening of an optical disk cartridge because the numerical aperture of the objective lens is not large and, therefore, the distance between the objective lens and the optical disk is large. For these reasons, the size of the optical head does not need to be reduced.

Although the optical head does not need to be stored in the opening of the optical disk cartridge, when a small optical head is to be used for a portable apparatus, the dynamic performance of the two-axis actuator of the optical head does not correspond to the high density recording disk format. To increase the recording density of the optical disk, the margins for defocusing and detracking are reduced and the sensitivity and frequency of the actuator are increased along with the increase in the transfer rate.

As described above, although a reduction in size and dynamic performance are required for the two-axis actuator, or, in other words, the optical head, that is used for an optical disk with a small diameter and a high recording density, known optical heads cannot meet these requirements.

In other words, the known optical head illustrated in FIG. 8 is not suitable for reducing the size because the magnets 20a and 20a of the same pole must be disposed along the Y axis, which is orthogonal to the optical axis of the objective lens 15, so that the magnets 20a and 20b oppose each other.

For the known optical head illustrated in FIG. 9, the size may be reduced by disposing the magnetic circuit on one side. By reducing the size, however, a secondary resonance of the movable parts including the objective lens and the coil bobbin decreases and the dynamic performance becomes unbalanced because of the difference in the positions of the center of gravity, the driving point, and the support point, making it difficult to improve the performance of the optical head.

For the known optical head illustrated in FIG. 10, the size may be reduced and the performance may be improved. In such a case, however, the linearity in the fine driving is not maintained because of the friction between the shaft and the shaft hole on the bobbin. Therefore, there is a problem in that the optical head is not suitable for an optical disk system with small defocusing and detracking margins.

An object of the present invention is to solve the above-mentioned problems and provide an optical head whose size can be easily reduced to a size that can be stored in an opening of a cartridge for an optical disk and whose dynamic performance can be easily improved along with an increase in recording density and transmitting rate.

DISCLOSURE OF INVENTION

To achieve the above-mentioned object, the optical head according to the present invention is a two-axis actuator optical head that drives an objective lens along the Z axis in the focus direction, that is, vertical to the surface of the optical disk and along the X axis in the tracking direction, that is, the radial direction of the optical disk. The optical head comprises a coil bobbin for supporting the objective lens by aligning the optical axis of the objective lens with the Z axis, a focusing coil disposed on the coil bobbin by being wound around the Z axis, a pair of tracking coils disposed on both edges of the coil bobbin in the X axis direction by being wound around the X axis, supporting means for supporting the coil bobbin slidably in the focus direction and tracking direction, two pairs of magnets opposing both ends of the tracking coils in the Y axis direction orthogonal to the Z axis and the X axis and magnetized in the Y axis direction so that the surfaces opposing the tracking coils are the same pole, a magnetic circuit forming a closed magnetic path in which the magnetic flux lines generated by one of the pair of magnets opposing each other with the focusing coil interposed between the magnets intersect the tracking coils and the focusing coil.

In the optical head according to the present invention, a magnetic circuit for generating a driving force in the tracking direction and focus direction without disposing the two pairs of magnets on the Y axis orthogonal to the optical axis of the objective lens can be formed. Therefore, the size of the optical head can be reduced in the Y axis direction.

Each pair of magnets is disposed plane-symmetrically to the Z-Y plane including the Z axis aligned with the optical axis of the objective lens and the Y axis, and the magnets magnetized in the Y axis direction are disposed so that the surfaces opposing the tracking coils are the same pole. Therefore, imbalance of the dynamic performance can be prevented because the center of gravity of the movable parts including the coil bobbin and the objective lens, the driving point of the focus (tracking), and the support point of the focus (tracking) align on the focus (tracking) axis, and the dynamic performance can be easily improved as the density and transfer rate are increased.

BEST MODE FOR CARRYING OUT THE INVENTION

Figure 1:
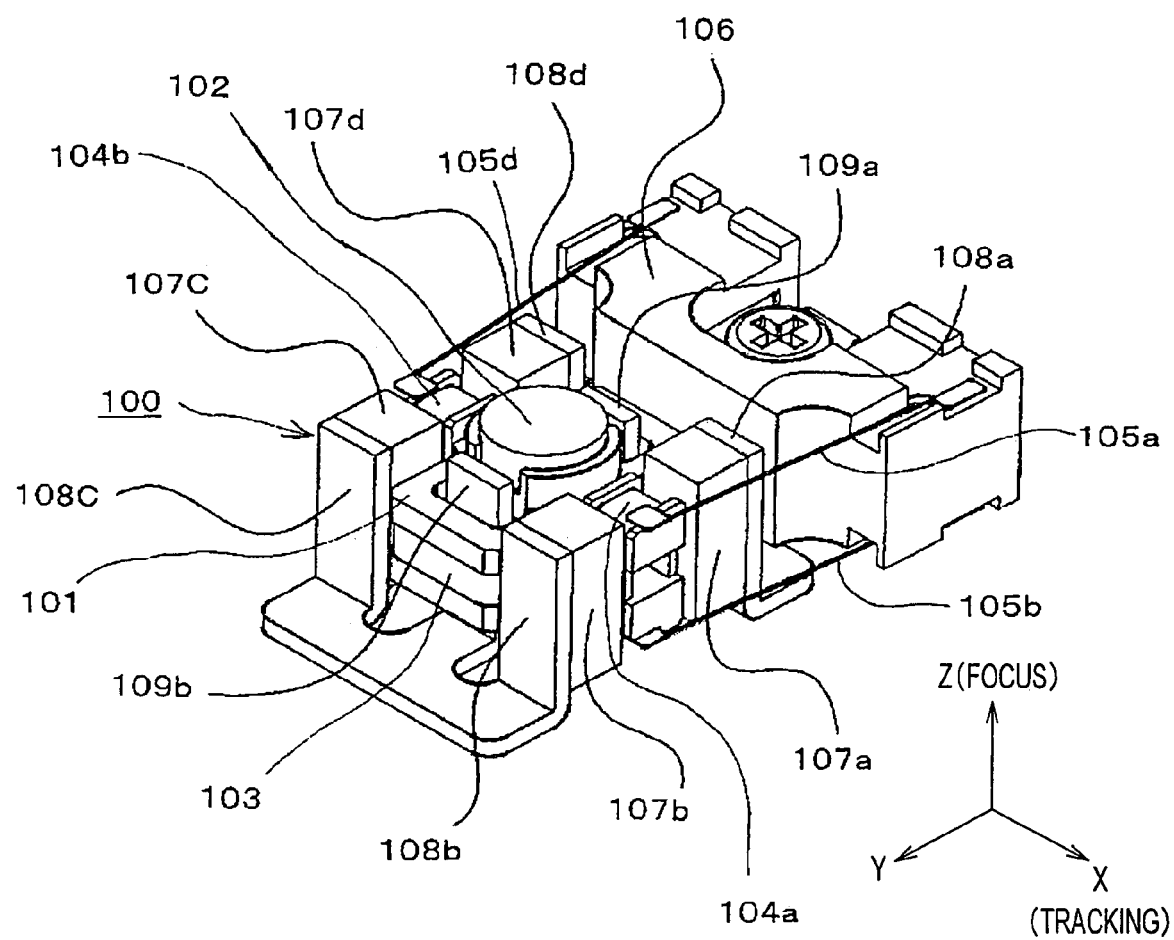
FIG. 1 is a perspective view of an embodiment of an optical head according to the present invention.

Embodiments of the present invention will be described in detail below by referring to the drawings.

Figure 2:
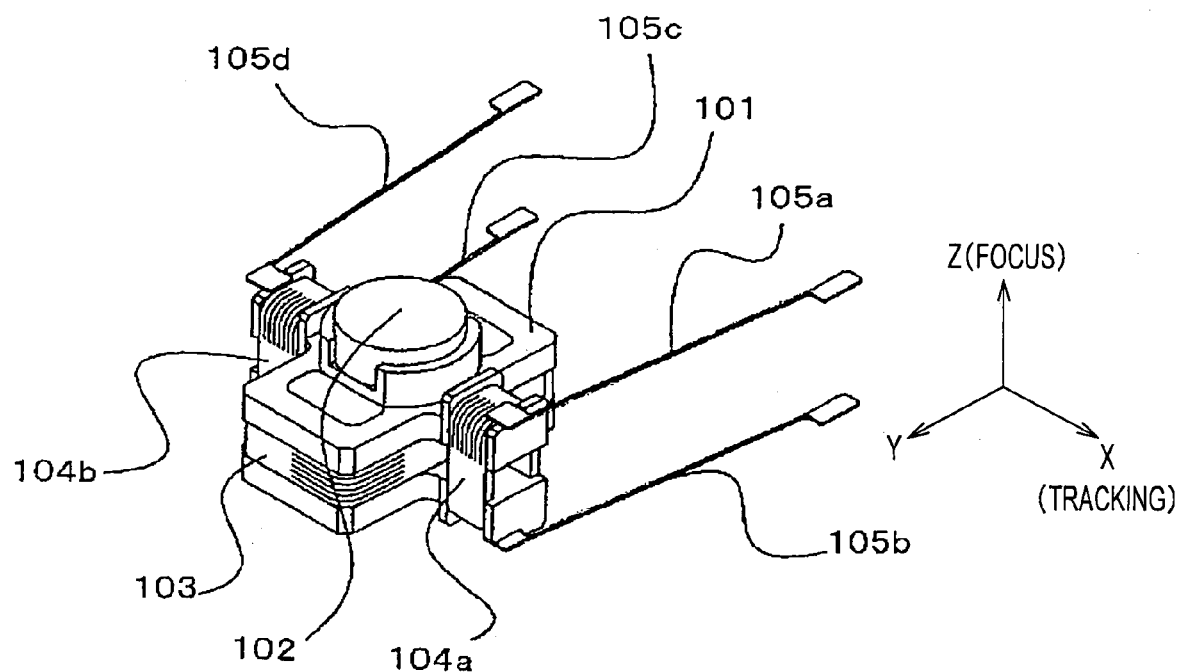
FIG. 2 is a perspective view of a coil bobbin, focusing coil, and tracking coils of an embodiment of an optical head according the present invention.
Figure 3:
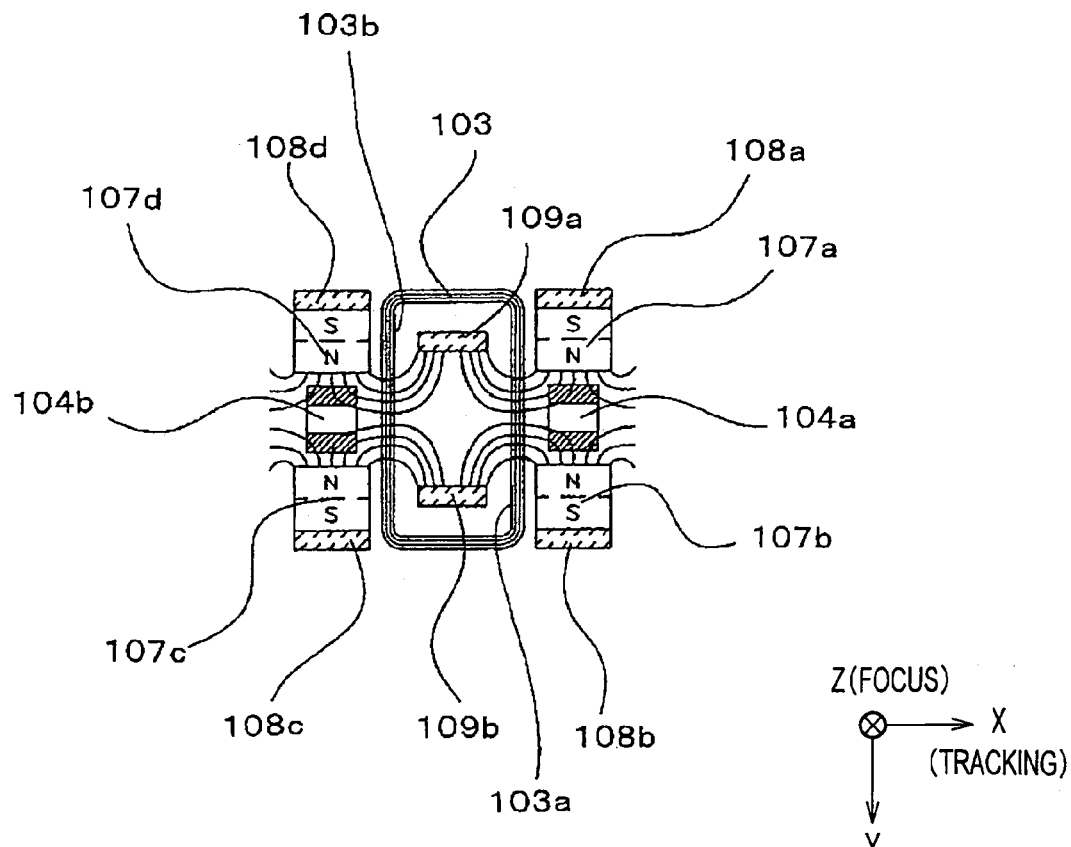
FIG. 3 is schematic view of the magnetic field distribution of magnets according to an embodiment of the present invention.
Figure 4:
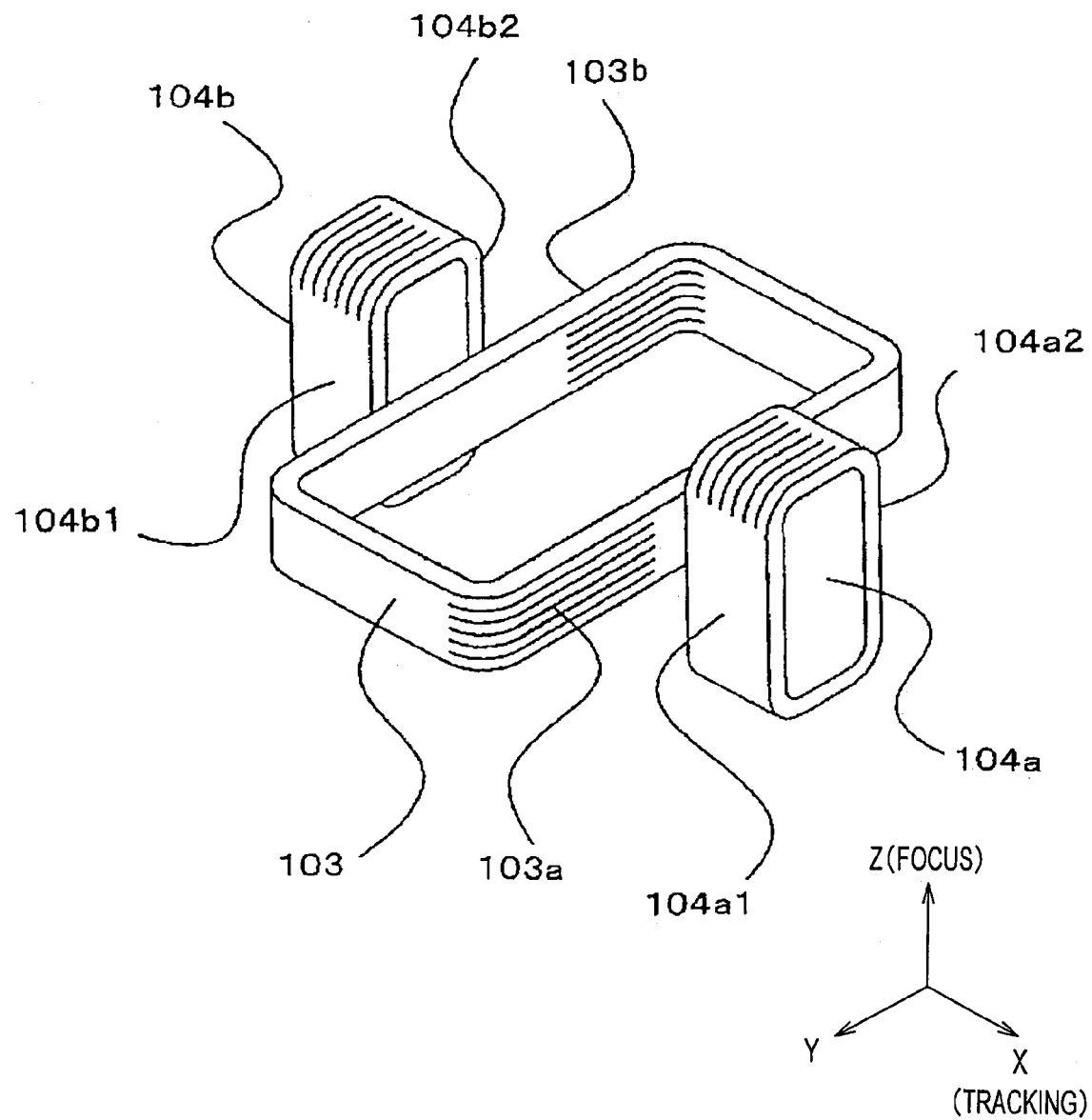
FIG. 4 is a descriptive perspective view of a focusing coil and tracking coils according to an embodiment of the present invention.
Figure 5:
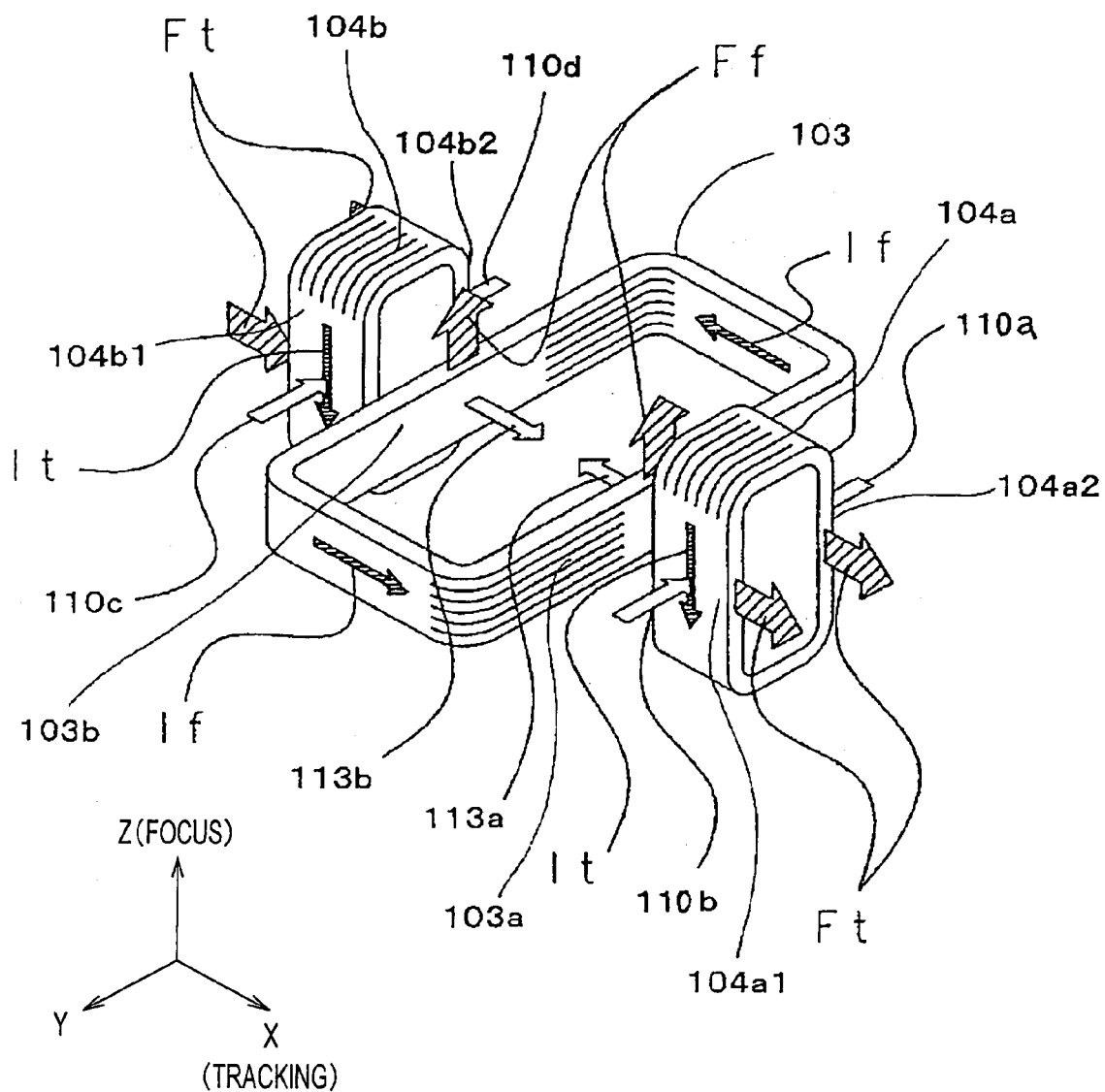
FIG. 5 is a schematic view of the driving principle of an embodiment of an optical head according to the present invention.

FIG. 1 is a perspective view illustrating an embodiment of an optical head according to the present invention. FIG. 2 is a perspective view of a coil bobbin, focusing coil, and tracking coils of an optical head according to an embodiment. FIG. 3 is a schematic view of the magnetic field distribution of magnets according to an embodiment. FIG. 4 is a descriptive perspective view of a focusing coil and tracking coils according to an embodiment. FIG. 5 is a schematic view of the driving principle of an optical head according to an embodiment.

In FIGS. 1 and 2, the reference numeral 100 indicates a two-actuator optical head that can compensate for surface deflection and decentering of an optical disk by driving an objective lens vertically with respect to the surface of the optical disk, that is, along the Z axis in the focus direction and in the radial direction of the optical disk, that is, along the X axis in the tracking direction. The optical head 100 includes a coil bobbin 101, an objective lens 102, a focusing coil 103, a pair of tracking coils 104a and 104b, four flat springs 105a to 105d (equivalent to supporting means in the claims), a support 106, four magnets 107a to 107d making up two pairs, yokes 108a to 108d corresponding to the magnets 107a to 107d, and back yokes 109a and 109b.

The objective lens 102 is disposed in the center of the coil bobbin 101 with its optical axis aligned with the Z axis (focus direction).

The focusing coil 103 is shaped as a rectangle extending in the Y axis direction and orthogonal to the Z axis and the X axis. The focusing coil 103 is wound around the Z axis so that it is disposed around the circumference of the periphery of the coil bobbin 101.

The tracking coils 104a and 104b are shaped as rectangles extending in the Z axis direction. The tracking coils 104a and 104b are disposed at both ends of the X axis of the coil bobbin 101 so that they are wound around the X axis.

The four flat springs 105a to 105d function as supporting means for supporting the coil bobbin 101 including the objective lens 102 so that the coil bobbin 101 is movable in the focus direction and the tracking direction. These flat springs 105a to 105d are connected with both sides in the X axis direction of the coil bobbin 101 at first ends and are fixed to the support 106 at second ends of the flat springs 105a to 105d.

The flat springs 105a to 105d are used as signal lines for supplying signals to the focusing coil 103 and the tracking coils 104a and 104b.

Among the magnets 107a to 107d, as illustrated in FIGS. 1 and 3, the magnets 107a and 107b making up a pair oppose the ends of the tracking coil 104a in the Y axis direction. The magnets 107c and 107d making up another pair oppose the ends of the tracking coil 104b in the Y axis direction, as illustrated in FIGS. 1 and 3. The magnets 107a to 107d are attached to yokes 108a to 108d, respectively, which are disposed vertically, parallel to the Z axis.

In this case, as illustrated in FIG. 3, the surfaces of the magnets 107a and 107b that oppose the tracking coil 104a are magnetized in the Y axis direction so that they are the same type of pole, e.g., north pole. As illustrated in FIG. 3, the surfaces of the magnets 107c and 107d that oppose the tracking coil 104b are magnetized in the Y axis direction so that they are the same type of pole, e.g., north pole. The pairs of magnets 107a to 107d, as illustrated in FIGS. 1 and 3, are disposed plane-symmetrically to the Z-Y plane including the Z axis aligned with the optical axis of the objective lens 102 and the Y axis, and to the Z-X plane including the Z axis aligned with the optical axis of the objective lens 102 and the X axis.

The back yokes 109a and 109b, as illustrated in FIGS. 1 and 3, are disposed inside the focusing coil 103 opposing both sides of the objective lens 102 in the Y axis direction so that the back yokes 109a and 109b stick out parallel to the Z axis.

Among the back yokes 109a and 109b, as illustrated in FIG. 3, at the back yoke 109a, the magnetic flux lines of the magnets 107a and 107d, which oppose each other with the focusing coil 103 interposed between the two, form a magnetic circuit with a closed magnetic path that intersects sides 103a and 103b of the focusing coil 103, a side 104a2 of the tracking coil 104a, and a side 104b2 of the tracking coil 104b. At the back yoke 109b, as illustrated in FIG. 3, the magnetic flux lines of the magnets 107b and 107c, which oppose each other with the focusing coil 103 interposed between the two, form a magnetic circuit with a closed magnetic path that intersects sides 103a and 103b of the focusing coil 103 and a side 104a1 of the tracking coil 104a and a side 104b1 of the tracking coil 104b.

For the optical head 100 structured as described above, the magnetic field distribution in the focusing coil 103 and the tracking coils 104a and 104b caused by the magnets 107a to 107d, the yokes 108a to 108d, and the back yokes 109a and 109b is as illustrated in FIG. 3.

In such a magnetic field distribution, as illustrated in FIG. 5, when an electrical current It is applied to the tracking coils 104a and 104b, a driving force Ft is generated in the tracking direction because magnetic flux lines 110a to 110d orthogonally intersect the sides 104a1 and 104a2 of the tracking coil 104a and the sides 104b1 and 104b2 of the tracking coil 104b. Thus, the objective lens 102 including the coil bobbin 101 is driven in the tracking direction due to the sum of the driving force Ft generated at the two tracking coils 104a and 104b.

As illustrated in FIG. 5, the magnetic flux lines 113a and 113b in opposite directions generated by opposing the same poles of the two pairs of magnets 107a to 107d intersect the sides 103a and 103b of the focusing coil 103 at a high magnetic flux density including a large proportion of orthogonal components since the back yokes 109a and 109b having a high magnetic permeability are provided. For this reason, when an electrical current If is applied to the focusing coil 103, a driving force Ff is generated in the focus direction and the objective lens 102 including the coil bobbin 101 is driven in the focus direction. In such a case, since the magnetic circuit forms a closed magnetic path because of the back yokes 109a and 109b, the acceleration sensitivity is high and the imbalance of the focus and tracking driving force generated when the objective lens 102 is displaced in the tracking direction is reduced.

According to the optical head of this embodiment, the size of the optical head can be reduced in the Y axis direction because a magnetic circuit can generate a driving force in the tracking direction and the focus direction without disposing the magnets 107a to 107d and the yokes 108a to 108d on the Y axis orthogonal to the optical axis of the objective lens 102. In this way, a small optical head that is smaller than 120 mm in diameter and has a high recording density and that can be stored inside an opening of a dust control cartridge for a small diameter disk is easily realized.

The magnets 107a to 107d are disposed plane-symmetrically to the Z-Y plane including the Z axis aligned with the optical axis of the objective lens 102 and the Y axis. In addition, the magnets 107a to 107d magnetized in the Y axis direction so that the surfaces opposing the tracking coils 104a are the same type of pole are disposed plane-symmetrically to the Z-X plane including the Z axis aligned with the optical axis of the objective lens 102 and the X axis. Since the magnets 107a to 107d are disposed in such a manner, the center of gravity of the movable parts of the coil bobbin 101 and the objective lens 102, the focus (tracking) driving point, and the focus (tracking) support point are aligned on the focus (tracking) axis. In this way, an imbalance in the dynamic performance is prevented, and the dynamic performance can be easily improved as the density and transfer rate are increased.

In the present invention, the direction in which the back yokes 109a and 109b are disposed is not limited to that illustrated in FIG. 1 in which the back yokes 109a and 109b are disposed perpendicularly to the Y axis with the objective lens 102 interposed between the back yokes 109a and 109b aligned on the Y axis.

Figure 6:
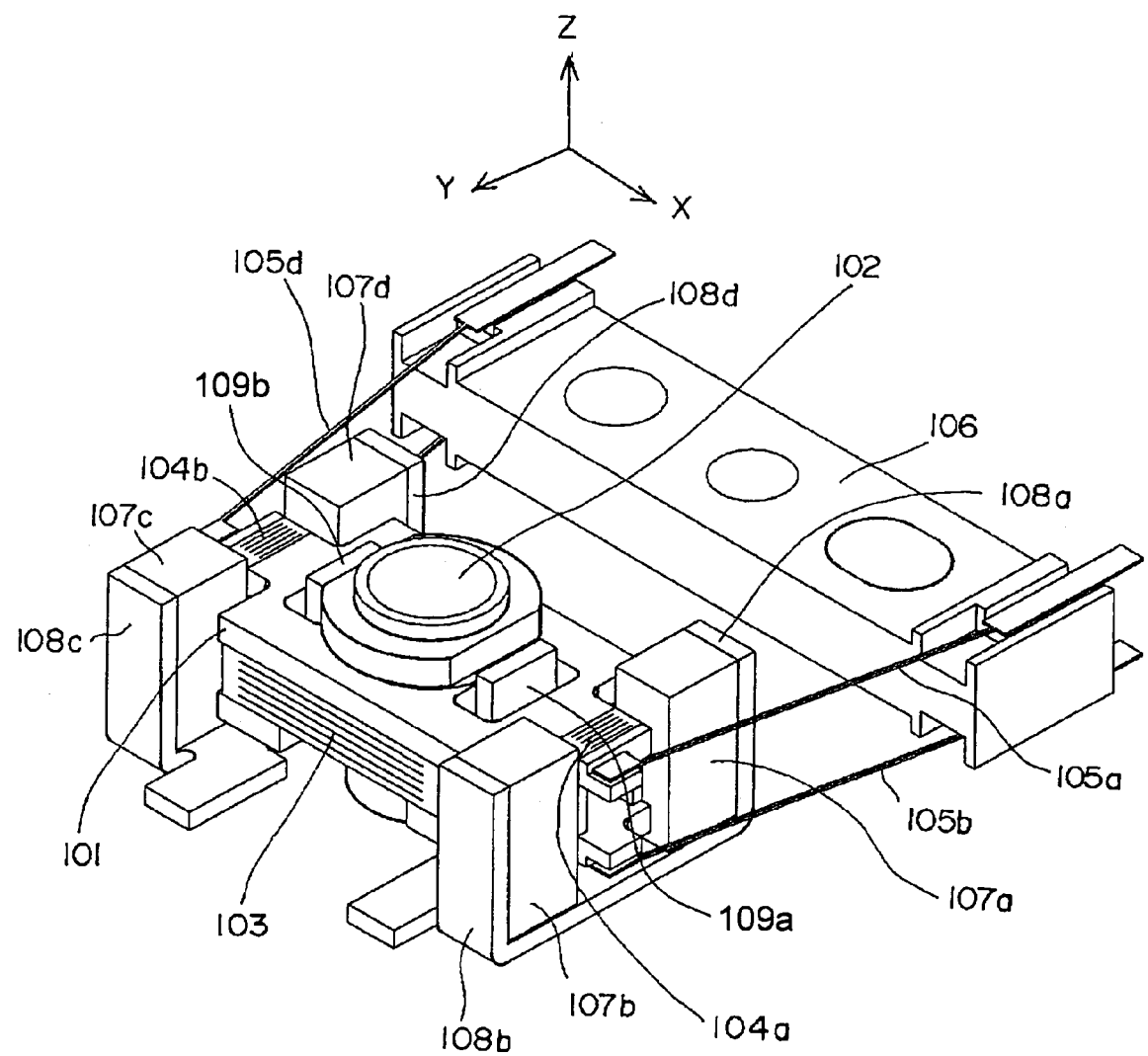
FIG. 6 is a perspective view of a back yoke of another embodiment of an optical head according to the present invention.

For example, as illustrated in FIG. 6, the back yokes 109a and 109b may oppose the sides of the objective lens 102 in the X axis direction and be disposed inside the focusing coil 103 on the in parallel with the Z axis.

In FIG. 6, reference numerals that are the same as those in FIG. 1 indicated the same components as FIG. 1.

In the present invention, magnetic field components orthogonal to the direction of magnetization of the magnets disposed so that the same poles oppose each other can be employed as a magnetic circuit of a voice coil motor. In the case of FIG. 1, this was applied only to the focusing coil. However, depending on the structure, this may be applied to the tracking coils or to both the tracking coils and the focusing coil.

The supporting means for the two-axis actuator optical head according to the present invention is not limited to that using flat springs such as the above-described embodiment. Hinges or other means may be used instead, as long as they can resiliently support the movable parts.

The back yokes 109a and 109b according to the above-described embodiment are not required since the repulsive force generated by the magnets in which the same poles oppose each other is used. In particular, when the bandwidth of the frequency response is more important than the acceleration sensitivity as a dynamic performance of the actuator, it might be more effective not to disposed back yokes.

The advantages of providing back yokes are an increase in the magnetic flux density and an increase in acceleration sensitivity due to a reduction in the force in the opposite direction caused by a leakage flux. On the other hand, an advantage of not providing back yokes is an increase in a secondary resonance of the movable parts since an opening for disposing the back yokes on the coil bobbin 101 is unnecessary.

From the above, requirements for an optical disk system including a two-axis actuator optical head can be met by providing back yokes when acceleration is required and by not providing back yokes when a high frequency at a cutoff is required.

Next, an optical head according to another embodiment of the present invention will be described by referring to FIG. 7.

Figure 7:
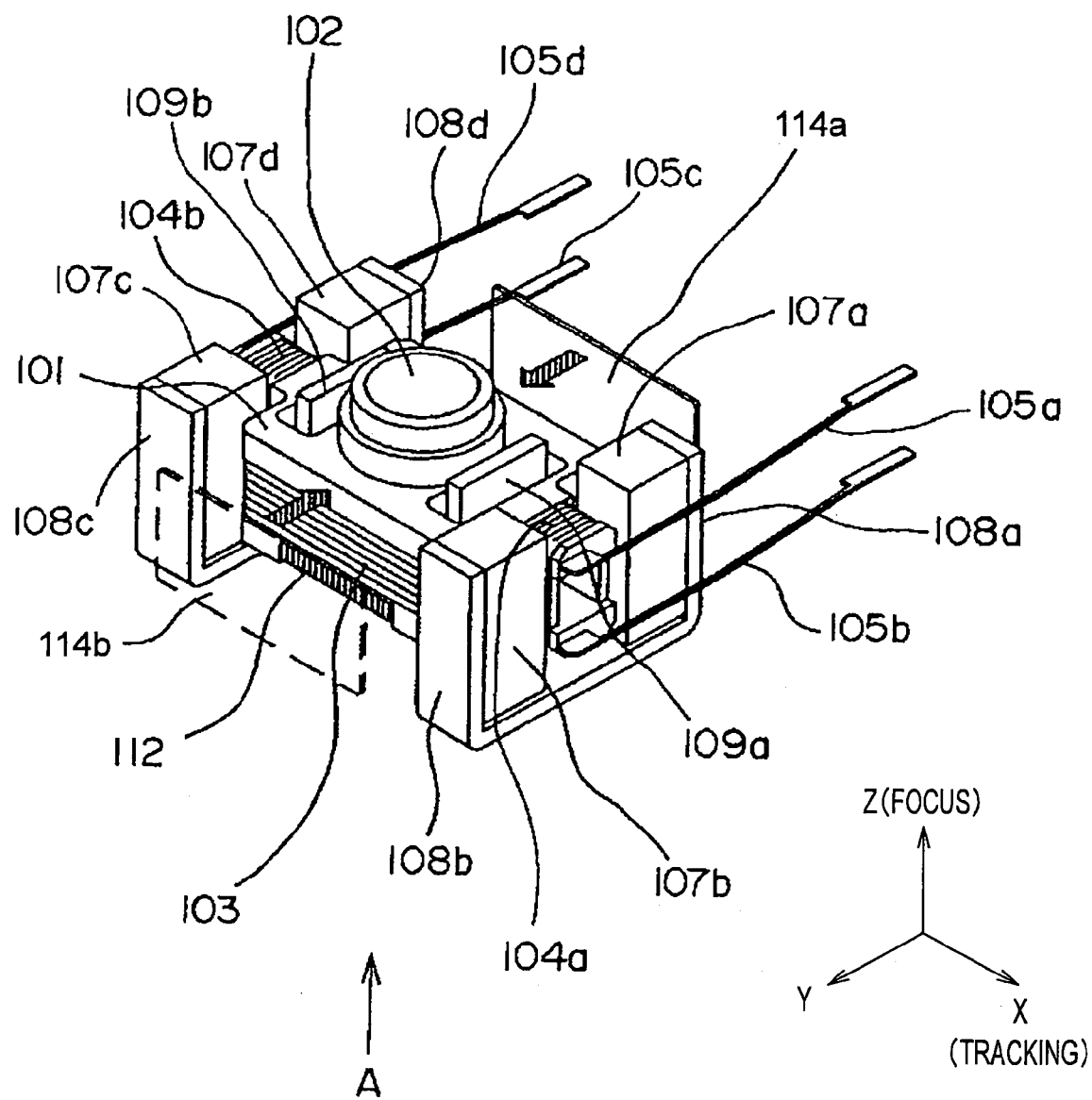
FIG. 7 is a perspective view of another embodiment of an optical head according to the present invention.
Figure 8:
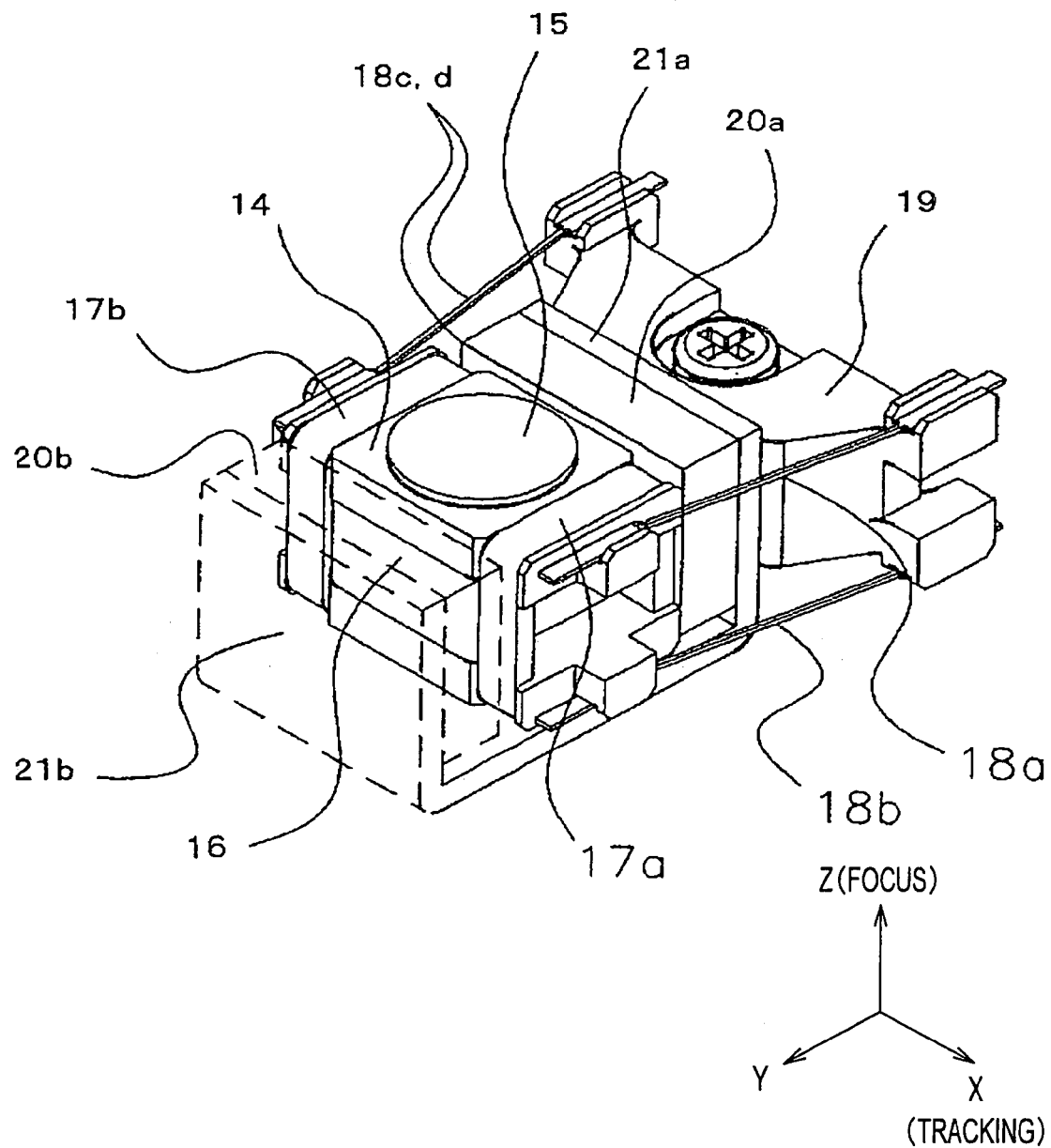
FIG. 8 is a perspective view of an example of a known optical head comprising a two-axis actuator with an open magnetic path.
Figure 9:
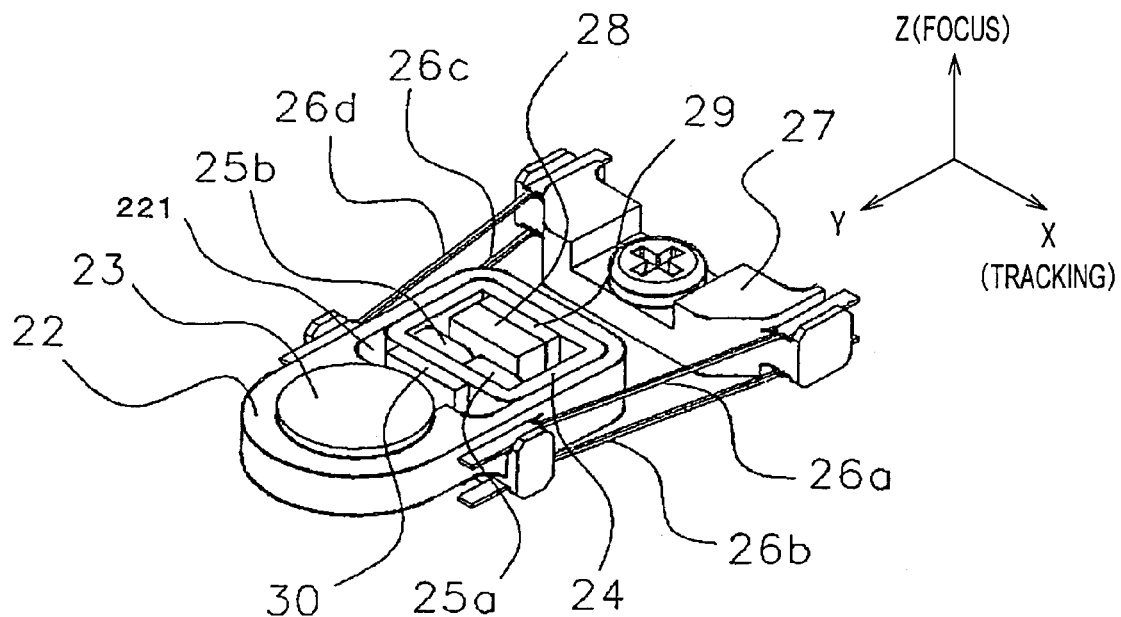
FIG. 9 is a perspective view of another example of a known optical head comprising a two-axis actuator with a closed magnetic path.
Figure 10:
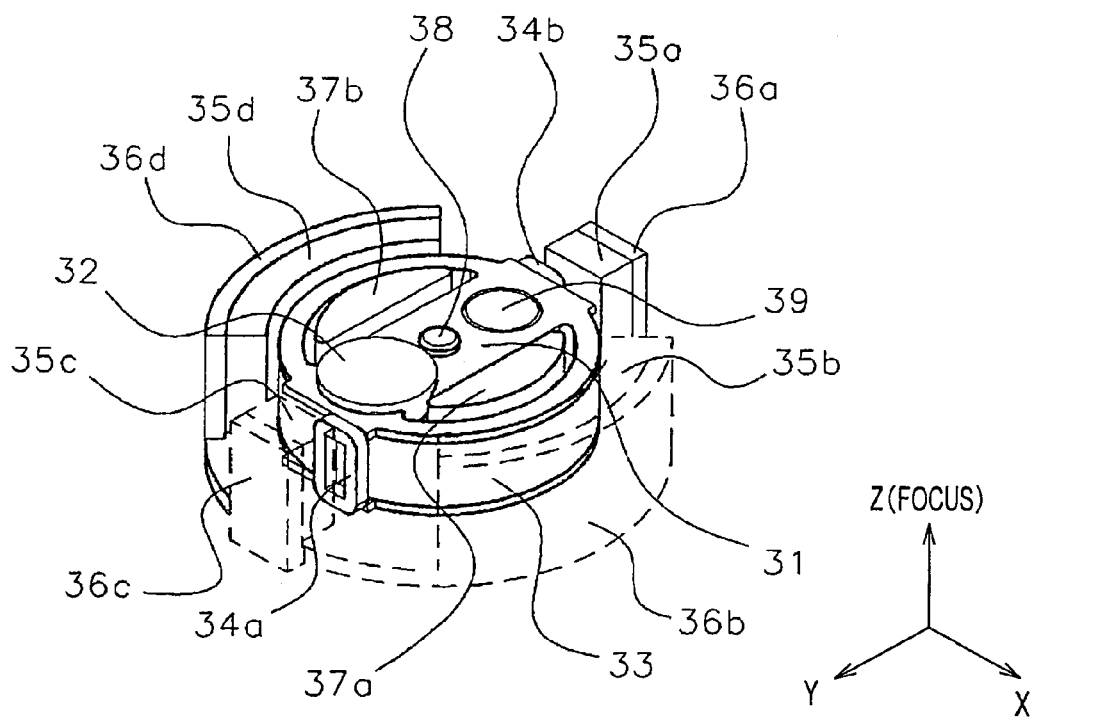
FIG. 10 is a perspective view of another example of a known optical head comprising an axial-sliding-type two-axis actuator.

FIG. 7 is a perspective view of an optical head according to another embodiment. In FIG. 7, the same reference numerals are used to indicate component that are the same as those in FIGS. 1 and 6 and their descriptions are omitted. Parts that are different from those in FIGS. 1 and 6 will be mainly described below.

The differences between FIG. 7 and FIGS. 1 and 6 are that a liquid crystal element 112 for compensating for the aberration of the objective lens 102 is disposed on the coil bobbin 101 and that flexible circuit boards 114a and 114b including a driving circuit element for the liquid crystal element 112 and a driving circuit element for the focusing coil 103 and the tracking coils 104a and 104b are disposed on the sides of the coil bobbin 101 in the Y axis direction in parallel with the Z-X plane including the Z axis aligned with the optical axis of the objective lens 102 and the X axis.

The liquid crystal element 112 is disposed on the coil bobbin 101 so that it is disposed on the lower surface of the objective lens 102, which, for example, is the side towards which the recording or reproducing optical beam is emitted from a direction, for example, indicated by the arrow A in FIG. 7.

The driving circuit elements included in the flexible circuit boards 114a and 114b receive a control signal from a controller (not depicted in the drawing) for driving the liquid crystal element and a control signal for driving the focusing coil and the tracking coils via the four flat springs 105a to 105d.

The circuit elements for driving the liquid crystal element included in the flexible circuit boards 114a and 114b demodulate the control signal supplied via the flat springs 105a to 105d and compensate for the aberration of the objective lens 102, such as spherical aberration, by driving the liquid crystal element 112 by supplying the demodulated signal to the liquid crystal element 112. Similarly, the coil driving circuit elements included in the flexible circuit boards 114a and 114b demodulate the control signal supplied via the flat springs 105a to 105d and control the objective lens 102 including the coil bobbin 101 in the focusing direction (Z axis direction) or tracking direction (X axis direction) by supplying the demodulated signal to the focusing coil 103 or the tracking coils 104a and 104b to excite the coil(s).

For the optical head according to this embodiment, the same effect as the optical head according to another embodiment illustrated in FIGS. 1 and 6 may be achieved. In addition, the flexible circuit boards 114a and 114b including the driving circuit elements for the liquid crystal element 112 and the focusing coil 103 and tracking coils 104a and 104b can be disposed on both sides of the coil bobbin 101 in the X axis direction in parallel with the Z-X plane. In this way, the installation area available for the circuit elements of the flexible circuit boards can be increased.

In the embodiment illustrated in FIG. 7, the flexible circuit boards 114a and 114b are disposed on both sides of the coil bobbin 101 in the Y axis direction in parallel with the Z-X plane including the Z axis aligned with the optical axis of the objective lens 102 and the X axis. The present invention is not limited to this, and the flexible circuit boards 114a and 114b may be disposed on both sides of the coil bobbin 101 in the X axis direction in parallel with the Z-Y plane including the Z axis aligned with the objective lens 102 and the Y axis, as illustrated in FIG. 7.

The circuit boards 114a and 114b in the present invention are not limited to flexible substrates.

In the embodiment illustrated in FIG. 7, the liquid crystal element 112 is disposed on the coil bobbin 101 on the lower surface of the objective lens 102. The present invention is not limited to this, and the liquid crystal element 112 may be incorporated in the optical system of the objective lens 102 or may be disposed on the side of the objective lens 102 from which the optical beam for recording or reproducing is output (the upper surface side of the objective lens 102 in FIG. 7).

As described above, the optical head according to the present invention easily realizes a small optical head capable of being stored in an opening of a dust control cartridge for a small diameter optical disk. Moreover, imbalance of the dynamic performance can be prevented because the center of gravity of the movable parts including the coil bobbin and the objective lens, the driving point of the focus (tracking), and the support point of the focus (tracking) align on the focus (tracking) axis, and the dynamic performance can be easily improved as the density and transfer rate are increased.

The invention claimed is:

1. An optical head having a two-axis actuator driving an objective lens in a focusing direction along a Z axis orthogonal to the surface of an optical disk and in a tracking direction along an X axis in the radial direction of the optical disk, comprising:

a coil bobbin for supporting the objective lens, the optical axis of the objective lens being aligned with the Z axis, a focusing coil wound around the Z axis and disposed on the coil bobbin;

a pair of tracking coils wound around the X axis and disposed on both ends of the coil bobbin in the X axis direction, supporting means for supporting the coil bobbin so that the coil bobbin is movable in the focusing direction and the tracking direction, two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity, a magnetic circuit forming a closed magnetic path in which magnetic lines generated by each pair of magnets sandwiching the focusing coil intersect the tracking coils and the focusing coil, wherein the supporting means comprises a plurality of flat springs, and wherein the flat springs function as signal lines for supplying signals to the focusing coil and the tracking coils.

2. The optical head according to claim 1, wherein the magnetic circuit comprises yokes corresponding to the respective magnets and back yokes disposed inside the focusing coil on both ends of the objective lens in the Y axis direction so that the back yokes are parallel with the Z axis.

3. The optical head according to claim 1, wherein the magnetic circuit comprises yokes corresponding to the respective magnets and back yokes disposed inside the focusing coil on both ends of the objective lens in the X axis direction so that the back yokes are parallel with the Z axis.

4. An optical head having a two-axis actuator driving an objective lens in a focusing direction along a Z axis orthogonal to the surface of an optical disk and in a tracking direction along an X axis in the radial direction of the optical disk, comprising:
- a coil bobbin for supporting the objective lens, the optical axis of the objective lens being aligned with the Z axis,
- a focusing coil wound around the Z axis and disposed on the coil bobbin,
- a pair of tracking coils wound around the X axis and disposed on both ends of the coil bobbin in the X axis direction,
- supporting means for supporting the coil bobbin so that the coil bobbin is movable in the focusing direction and the tracking direction,
- two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity,
- a magnetic circuit forming a closed magnetic path in which magnetic lines generated by each pair of magnets sandwiching the focusing coil intersect the tracking coils and the focusing coil, wherein the pair of magnets are disposed plane-symmetrically to the Z-Y plane including the Z axis aligned with the optical axis of the objective lens and the Y axis and the Z-X plane including the Z axis aligned with the optical axis of the objective lens and the X axis.

5. The optical head according to claim 4, wherein the magnetic circuit comprises yokes corresponding to the respective magnets and back yokes disposed inside the focusing coil on both ends of the objective lens in the Y axis direction so that the back yokes are parallel with the Z axis.

6. The optical head according to claim 4, wherein the magnetic circuit comprises yokes corresponding to the respective magnets and back yokes disposed inside the focusing coil on both ends of the objective lens in the X axis direction so that the back yokes are parallel with the Z axis.

7. An optical head having a two-axis actuator driving an objective lens in a focusing direction along a Z axis orthogonal to the surface of an optical disk and in a tracking direction along an X axis in the radial direction of the optical disk, comprising:
- a coil bobbin for supporting the objective lens, the optical axis of the objective lens being aligned with the Z axis,
- a focusing coil wound around the Z axis and disposed on the coil bobbin,
- a pair of tracking coils wound around the X axis and disposed on both ends of the coil bobbin in the X axis direction,
- supporting means for supporting the coil bobbin so that the coil bobbin is movable in the focusing direction and the tracking direction,
- two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity,
- a magnetic circuit forming a closed magnetic path in which magnetic lines generated by each pair of magnets sandwiching the focusing coil intersect the tracking coils and the focusing coil, wherein the objective lens comprises a liquid crystal element for compensating for an aberration of the objective lens.

8. An optical head having a two-axis actuator driving an objective lens in a focusing direction along a Z axis orthogonal to the surface of an optical disk and in a tracking direction along an X axis in the radial direction of the optical disk, comprising:
- a coil bobbin for supporting the objective lens, the optical axis of the objective lens being aligned with the Z axis,
- a focusing coil wound around the Z axis and disposed on the coil bobbin,
- a pair of tracking coils wound around the X axis and disposed on both ends of the coil bobbin in the X axis direction,
- supporting means for supporting the coil bobbin so that the coil bobbin is movable in the focusing direction and the tracking direction,
- two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity,
- a magnetic circuit forming a closed magnetic path in which magnetic lines generated by each pair of magnets sandwiching the focusing coil intersect the tracking coils and the focusing coil, wherein circuit boards having a circuit element for driving the focusing coil and the tracking coils are disposed on both sides of the coil bobbin in the X axis direction parallel to the Z-Y plane including the Z axis aligned with the optical axis of the objective lens and the Y axis and/or both sides of the coil bobbin in the Y axis direction parallel to the Z-X plane including the Z axis aligned with the optical axis of the objective lens and the X axis.

9. An optical head having a two-axis actuator driving an objective lens in a focusing direction along a Z axis orthogonal to the surface of an optical disk and in a tracking direction along an X axis in the radial direction of the optical disk, comprising:
- a coil bobbin for supporting the objective lens, the optical axis of the objective lens being aligned with the Z axis,
- a focusing coil wound around the Z axis and disposed on the coil bobbin,
- a pair of tracking coils wound around the X axis and disposed on both ends of the coil bobbin in the X axis direction,
- supporting means for supporting the coil bobbin so that the coil bobbin is movable in the focusing direction and the tracking direction,
- two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity,
- a magnetic circuit forming a closed magnetic path in which magnetic lines generated by each pair of magnets sandwiching the focusing coil intersect the tracking coils and the focusing coil, wherein the objective lens comprises a liquid crystal element for compensating for the aberration of the objective lens, and a circuit board having at least one of the circuit elements for driving the focusing coil, the tracking coils, or the liquid crystal element is disposed on both sides of the coil bobbin in the X axis direction parallel to the Z-Y plane including the Z axis aligned with the optical axis of the objective lens and the Y axis and/or both sides of the coil bobbin in the Y axis direction parallel to the Z-X plane including the Z axis aligned with the optical axis of the objective lens and the X axis.

10. An optical head having a two-axis actuator driving an objective lens in a focusing direction along a Z axis orthogonal to the surface of an optical disk and in a tracking direction along an X axis in the radial direction of the optical disk, comprising:
- a coil bobbin for supporting the objective lens, the optical axis of the objective lens being aligned with the Z axis,
- a focusing coil wound around the Z axis and disposed on the coil bobbin,
- a pair of tracking coils wound around the X axis and disposed on both ends of the coil bobbin in the X axis direction,
- supporting means for supporting the coil bobbin so that the coil bobbin is movable in the focusing direction and the tracking direction,
- two pairs of magnets disposed so that magnets in each pair are disposed opposingly on both ends of the corresponding tracking coils in the Y axis direction which is orthogonal to both the Z axis and the X axis, the surfaces of the magnets opposing the tracking coils are magnetized in the Y axis direction and have the same polarity,
- a magnetic circuit forming a closed magnetic path in which magnetic lines generated by each pair of magnets sandwiching the focusing coil intersect the tracking coils and the focusing coil, wherein the supporting means comprises a plurality of flat springs, the objective lens comprises a liquid crystal element for compensating for the aberration of the objective lens, a circuit board having at least a circuit element for driving the liquid crystal among the circuit elements for driving the focusing coil, the tracking coils, or the liquid crystal element is disposed on both sides of the coil bobbin in the X axis direction parallel to the Z-Y plane including the Z axis aligned with the optical axis of the objective lens and the Y axis and/or both sides of the coil bobbin in the Y axis direction parallel to the Z-X plane including the Z axis aligned with the optical axis of the objective lens and the X axis, and the flat springs function as signal lines for supplying signals to the circuit boards for driving.

* * * * *